UNITED STATES PATENT OFFICE 2,443,165

PROCESS OF PREPARING PTERINS

Martin E. Hultquist, Bound Brook, and Paul F. Dreisbach, Somerville, N. J., assignors to American Cyanamid Company, New York, N. Y., a corporation of Maine No Drawing. Application October 4, 1946, Serial No. 701,082

14 Claims. (Cl. 260—251)

This invention relates to a new process of preparing pterins.

The group of compounds generically known as pterins has recently become of considerable importance because of the fact that certain members possess useful therapeutic properties. The term pterins is generally applied to those compounds having fused pyrimido-pyrazine nuclei. The most significant compound of this class now known has been called pteroylglutamic acid. More exactly, it may be designated N-[4-{-[(2-amino-4-hydroxy-6-pyrimido [4,5-b] pyrazyl) methyl]-amino}benzoyl]glutamic acid. This latter compound appears to be identical with, or possesses the same properties of, naturally occurring L. casei factor or folic acid. It has been found to be useful in the treatment of macrocytic anemias, sprue and other related diseases of the blood.

The structure of pteroylglutamic acid and methods of synthesizing it have been described by the present inventor and co-workers in Science, vol. 103, May 31, 1946, pages 667–669. As also noted there, other related pterins may be prepared by the same methods and some of these compounds likewise possess biological activity.

The new process of the present invention involves the reaction of 2,4,5-triamino-6-hydroxypyrimidine, a trihalo acetone and aminobenzoic acid or one of its amides. The reaction may be illustrated by the following equation:

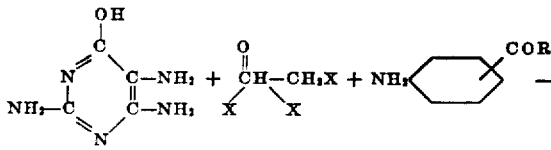 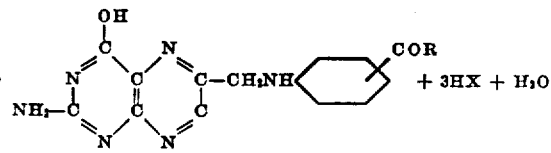

In these formulas X represents one of the halogens such as chlorine, bromine, or iodine, and R represents an —OH group or an amide-forming radical, such as —NHR' in which R' is hydrogen or an aliphatic radical.

The compound 2,4,5-triamino-6-hydroxypyrimidine is known. Although it most probably exists in the form illustrated, it may also exist in whole, or in part, in one or more tautomeric or resonant forms, such as, for example, 2,4,5-triamino-pyrimidone-6. As would be expected, these tautomeric forms react similarly and reference hereinafter to the one tautomer includes the like use of any of the various tautomers. The compound is usually used in the form of one of its acid salts, such as the sulfate or hydrochloride but, if desired, the free base may also be used.

Trihalo acetones are also known compounds. The substituent halogens may be all alike or may vary from one to another on the possible locations indicated by X in the general formula.

The carbonyl radical, with its substituent R, may be located on any position on the benzene ring with respect to the amino group although it is preferred that it be in the para-position. Para-aminobenzoic acid or any of its salts, esters or amides may be used in the process. The amides preferred are those of amino acids in that the final products possess the most useful biological properties when this is so. The preferred amino acid amide is that of glutamic acid although other amino acid amides, such as those of glycine, aspartic acid, leucine, alanine, isovaline, cysteine, and the like with aminobenzoic acid may be used. The group —NHR' may also represent an amino radical having one or more peptid linkages, such as glutamylglutamic, glutamylglutamylglutamic, glutamylglycylglutamic, and the like. The salts and esters of these amino acid amides may also be used in the process. Diethyl p-aminobenzoyl-glutamate is particularly useful.

The reaction conditions may vary considerably, particularly as to hydrogen ion concentration. The reaction may be carried out at a hydrogen ion concentration of from about pH 1 or even less, to about pH 7. Best results are obtained, however, within the range pH 1 to pH 5. The temperature of the reaction may vary from about 0° up to about 60° C.

The advantages in the present process over other processes of preparing these compounds are that no oxidizing agent is necessary and that there is less likelihood of the trihaloacetone polymerizing during the reaction, as can occur when using dihalopropionaldehydes.

As will be seen from the specific examples, the reactants may be added to each other in various orders. Best results seem to be obtained, however, when all three of the principal reactants are mixed together at the same time. As will be apparent from the nature of the reactants, various side reactions can occur and the simultaneous reaction of the three intermediates decreases the tendency for the other two to first react with each other to yield products which cannot form a part of the desired compound.

The process will now be illustrated in greater detail by means of the following examples in which various trihaloacetones are reacted with the other intermediates under various conditions. The process, however, is by no means limited to the particular conditions of these examples. All parts are by weight unless otherwise indicated.

Example 1

To a solution of 12.2 parts barium chloride dihydrate in 350 parts water at 60° C. was added 12.9 parts of the sulfate of 2,4,5-triamino-6-hydroxy-pyrimidine. After stirring at 60° C. for 10 minutes the mixture was cooled to 40° C. and 13.3 parts p-aminobenzoylglutamic acid was added. The pH of the solution was immediately adjusted to approximately 3 to 3.5 by the addition of 20% sodium hydroxide solution.

There was then added slowly with stirring over a period of 50 minutes a solution of 10.3 parts 1,1-dichloro-3-bromo-propanone-2 in 15 parts glacial acetic acid. A temperature of 40° C. was maintained throughout this addition and the pH of the solution was kept at 3 to 3.5 by the further addition of 20% sodium hydroxide solution.

After the addition was complete, the mixture was stirred for 15 minutes at 40° C. and then cooled to 15° C. by the addition of ice. Filtration and washing the precipitate with water and alcohol gave 23.5 parts brown solid, consisting of barium sulfate and the reaction product containing the pteroylglutamic acid.

The product of this example contained about 10.8% of pteroylglutamic acid. For use as an adjunct to animal feeds, it could be used as such but for most purposes, including its use as a therapeutic agent for humans, the product should be purified further. The purification of the material may be accomplished by a variety of processes, a preferred process being substantially as follows.

The crude reaction product is dissolved in hot limewater at a concentration from about one part of real pteroylglutamic acid per thousand parts of solution. The temperature of the solution is preferably about 70° C. and the pH about 11.0. The hot solution is filtered to remove insolubles and then cooled and adjusted to a pH between 3 and 4. The pteroylglutamic acid which precipitates is recovered by filtration in a higher degree of purity.

To purify the pteroylglutamic acid still further it is treated with concentrated hydrochloric acid at the rate of about 100 parts of hydrochloric acid for each 5 parts by weight of real pteroylglutamic acid. Most of the material dissolves to give a clear brown solution. 25 parts of activated charcoal is added and, after 20 minutes, the mixture is filtered. The filter cake is washed with about 30 parts of concentrated hydrochloric acid and the combined filtrate and washings are diluted with 100 parts of water and cooled to about 5° C. and after about one hour the precipitate is collected on a filter, washed with water and acetone, and dried. The product thus obtained has a purity of over 80% and is suitable for most therapeutic uses.

Example 2

To a solution of 12.2 parts barium chloride dihydrate in 350 parts water at 60° C. was added 12.9 parts of the sulfate of 2,4,5-triamino-6-hydroxypyrimidine. After stirring at 60° C. for 10 minutes, the mixture was cooled to 40° C. and 13.3 parts p-aminobenzoylglutamic acid was added. The pH of the solution was immediately adjusted to 3 to 3.5 by the addition of 20% sodium hydroxide solution.

There was then added dropwise with stirring over a period of 50 minutes, 10.3 parts 1,3-dichloro-1-bromopropanone-2 dissolved in 15 parts glacial acetic acid. A temperature of 40° C. was maintained throughout this addition and the pH of the solution was kept at 3 to 3.5 by the further addition of 20% sodium hydroxide solution.

After the addition was complete, the mixture was stirred for 15 minutes at 40° C. and then cooled to 15° C. by the addition of ice. The mixture was filtered and after washing with water and alcohol there was obtained 20 parts brown solid, consisting of barium sulfate and the reaction product containing pteroylglutamic acid. An additional 1.5 parts of purer product was obtained by filtration of the mother liquor after standing.

The product of this example and the succeeding examples may also be purified by the procedure described in Example 1.

Example 3

A solution of 13.3 parts p-aminobenzoylglutamic acid was prepared in 175 parts water containing sufficient sodium hydroxide to bring the pH to approximately 10. To this was added 10.3 parts, 1,1-dichloro-3-bromo-propanone-2 in 15 parts acetic acid with stirring over a period of 20 minutes, keeping the temperature between 4° and 10° C. by the addition of ice. Sodium hydroxide solution was added to keep the pH approximately constant. After the addition was complete, the stirring was continued, allowing the mixture to rise to room temperature. The solution was then brought approximately to the neutral point by the addition of dilute hydrochloric acid.

There was then added slowly over a period of 15–20 minutes with stirring at a temperature of 40° C. to 175 parts of an aqueous solution containing 7.05 parts 2,4,5-triamino-6-hydroxypyrimidine as the hydrochloride. Throughout the addition, the pH of the mixture was maintained at approximately 3.5 to 4. After the addition was completed, the mixture was stirred at 40° C. for 15 minutes and finally for one hour at 20° C. after cooling by the addition of ice. After precipitation was complete, filtration and washing with alcohol and water gave 8.1 parts of a dark solid which contained pteroylglutamic acid.

Example 4

To a solution of 13.3 parts p-aminobenzoylglutamic acid in 100 parts ethanol was added 10.3 parts 1,1-dichloro-3-bromopropanone-2. After standing overnight at room temperature, the mixture acquired a dark-orange color. 15 parts glacial acetic acid was added and the whole mixture was put aside for use as indicated below.

A solution of 2,4,5-triamino-6-hydroxypyrimidine was prepared by stirring 12.9 g. of the sulfate with 12.2 parts barium chloride dihydrate at 60° C. in 375 cc. water. After treatment of the solution with 10 parts acetic acid and enough 20% sodium hydroxide solution to effect a pH of approximately 4, the alcoholic solution from above was added slowly with stirring at 40° C. over a 30 minute period, keeping the pH of the solution approximately constant by the further addition of dilute sodium hydroxide solution as necessary. The whole mixture was stirred an additional 15 minutes at 40° C. and was then cooled to 15° C. by addition of ice. Filtration followed by washing with water and alcohol gave 24.5 parts brown solid material consisting of barium sulfate and the reaction product. Biological assay showed the product to contain 7.15% pteroylglutamic acid.

Example 5

To a solution of 12.2 parts barium chloride dihydrate in 350 parts water at 60° C. was added 12.9 parts of the sulfate of 2,4,5-triamino-6-hydroxypyrimidine. After stirring at 60° C. for 10 minutes the mixture was cooled to 40° C. and 13.3 parts p-aminobenzoylglutamic acid was added. The pH of the solution was immediately adjusted to 6.5–7 by the addition of the necessary amount of 20% sodium hydroxide solution.

There was then added dropwise with stirring over a period of 30 minutes a solution of 10.3 parts 1,1-dichloro-3-bromopropanone-2 in 15 parts acetic acid, maintaining a temperature of 40° C. throughout this addition. Simultaneously there was added 20% sodium hydroxide solution dropwise to keep the solution as nearly neutral as possible at a pH of 6.5 to 7. The mixture was then stirred at 40° C. for 15 minutes and then cooled to 15° C. by the addition of ice.

By the addition of dilute hydrochloric acid, the mixture was then acidified to a pH of approximately 3.5 and after stirring at 15° C. for an additional period, filtration and washing with water and alcohol, there was obtained 20 parts brown solid material consisting of barium sulfate and the reaction product containing pteroylglutamic acid.

Example 6

To a solution of 12.2 parts barium chloride dihydrate in 350 parts water at 60° C. was added 12.9 parts of the sulfate of 2,4,5-triamino-6-hydroxypyrimidine. After stirring at 60° C. for 10 minutes, the mixture was cooled to 40° C. and 13.3 parts p-aminobenzoylglutamic acid was added. The solution was then made strongly acid in reaction by the addition of 30 parts 5 N hydrochloric acid. There was then added dropwise with stirring over a period of 40 minutes, 10.3 parts 1,3-dichloro-1-bromopropanone-2 dissolved in 15 parts glacial acetic acid, a temperature of 40° C. being maintained throughout the addition and no additional alkali or acid solution being added to control the pH of the solution. The mixture acquired a light lemon yellow color in this period and after cooling to 20° C. by the addition of ice, 20% sodium hydroxide solution was added to increase the pH to approximately 3.5–4, causing the product to start separating out as a brown precipitate. After stirring one hour at 20–25° C. further precipitation of the brown solid material had taken place and the solid material was removed by filtration.

A small additional amount of product was obtained from the mother liquor after standing overnight, and after washing the total combined brown solid product, there was obtained a total of 22.6 parts solid material consisting of barium sulfate and the reaction product containing pteroylglutamic acid.

Example 7

To a solution of 12.2 parts barium chloride dihydrate in 350 parts water at 60° C. was added 12.9 parts of the sulfate of 2,4,5-triamino-6-hydroxypyrimidine. After stirring at 60° C. for 10 minutes, the mixture was cooled to 40° C. and 13.3 parts p-aminobenzoylglutamic acid was added. The pH of the solution was immediately adjusted to 3–3.5 by the addition of 20% sodium hydroxide solution.

There was then added dropwise with stirring over a 25 minute period, a crude tribromacetone mixture calculated to contain 10.3 parts tribromacetone. A temperature of 40° C. was maintained throughout this addition and the pH of the solution was kept at 3–4 by the further addition of 20% sodium hydroxide solution. After the addition was complete the mixture was stirred for 15 minutes at 40° C. and then cooled to 15° C. by the addition of ice. Filtration of the mixture gave, after washing with water and alcohol, 23.0 parts brown solid material consisting of barium sulfate and the reaction product containing pteroylglutamic acid.

Example 8

To a solution of 12.2 parts barium chloride dihydrate in 250 parts water at 60° C. was added 12.9 parts of the sulfate of 2,4,5-triamino-6-hydroxypyrimidine. After stirring 10 minutes at 60° C. the barium sulfate was filtered and discarded. 100 parts acetic acid was then added and the pH was adjusted to approximately 4 with stirring at 40°–45° C. There was then added 10.3 parts 1,1-dichloro-3-bromopropanone-2 in 15 parts acetic acid over a 35 minute period. After stirring at 40° C. an additional 20 minutes, ice was added to decrease the temperature to 15° C. Filtration and washing with water and alcohol gave 5 parts dark solid material.

The finely pulverized 5 parts solid product was suspended in 200 parts water and dilute hydrochloric acid was added to a pH of approximately 1. Then with stirring at 35–40° C. there was added 5 parts p-aminobenzoylglutamic acid. The mixture was made alkaline in reaction (pH 8) by the addition of 20% sodium hydroxide solution and after stirring for 1 hour at 40° C. ice was added to cool the mixture to 15° C. It was stirred for 15 minutes at 15° C. after the addition of dilute hydrochloric acid to bring the pH to 4. Two parts Hyflo was added to facilitate filtration, which after washing with water and alcohol gave 7.5 parts solid material consisting of the 2 parts Hyflo and the product containing the pteroylglutamic acid.

Example 9

A solution of 2,4,5-triamino-6-hydroxypyrimidine was prepared by adding 12.9 parts of the sulfate to a solution of 12.2 parts barium chloride dihydrate in 200 parts water at 60° C. After stirring at 60° C. for 10 minutes the solution was cooled to 40° C. and 10 parts acetic acid and 12 parts 20% sodium hydroxide solution were added, bringing the pH to approximately 3.5.

Another solution of 13.3 parts p-aminobenzoylglutamic acid in 200 parts water was prepared and to this was added 5 parts 5 N hydrochloric acid and 5 parts glacial acetic acid. The pH was adjusted to 3–3.5 by the addition of 20% sodium hydroxide solution and at 40° C. there was added with stirring over a period of 20 minutes, 10.3 parts 1,1-dichloro-3-bromo-propanone-2. A small amount of ice was added during this period to maintain a temperature of 40° C. The mixture was finally stirred 15 minutes at 40° C. and then allowed to cool to room temperature spontaneously. After the addition of 15 parts acetic acid to this solution, the whole was then added slowly with stirring at 40° C. over a 30-minute period to the 2,4,5-triamino-6-hydroxypyramidine solution prepared above. During the addition, 20% sodium hydroxide was added to keep the pH around 3.5. After stirring an additional 15 minutes at 40° C. the mixture was finally cooled by the addition of ice and stirred 15 minutes at 15° C. Filtration and washing of the precipitate with water and alcohol gave 24.4 parts light brown solid material consisting of barium sulfate and about 11.9% pteroylglutamic acid.

*Example 10*

To a solution of 12.2 parts barium chloride dihydrate in 350 parts water at 60° C. was added 12.9 parts of the sulfate of 2,4,5-triamino-6-hydroxypyrimidine. After stirring at 60° C. for 10 minutes, the mixture was cooled to 40° C. and 13.3 parts p-aminobenzoylglutamic acid was added. The pH of the solution was immediately adjusted to approximately 3 to 3.5 by the addition of 20% sodium hydroxide solution.

There was then added dropwise with stirring over a 45 min. period, a solution of 14.7 parts 1,1,3-tribromopropanone-2 in 15 parts acetic acid. A temperature of 40° C. was maintained during the addition and the pH of the solution was kept at 3 to 3.5 by the further addition of 20% sodium hydroxide solution.

After the addition was complete, the mixture was stirred an additional 20 minutes at 40° C. and then cooled to 15° C. by the addition of ice. Filtration and washing of the precipitate with water and alcohol gave 24.5 parts brown solid consisting of barium sulfate and the crude folic acid. Assay showed the filtered, washed material to contain 11.6% pteroylglutamic acid.

*Example 11*

To a solution of 12.2 parts barium chloride dihydrate in 350 parts water at 60° C. was added 12.9 parts of the sulfate of 2,4,5-triamino-6-hydroxypyrimidine. After stirring at 60° C. for 10 minutes, the mixture was cooled to 40° C. and 13.3 parts p-aminobenzoylglutamic acid was added. The pH of the solution was immediately adjusted to approximately 3 to 3.5 by the addition of 20% sodium hydroxide solution.

There was then added dropwise with stirring over a one hour period at 40° C., a solution of 7.3 parts (.05 mole) 1,1,3-trichloro-propanone-2 in 15 parts acetic acid. The pH of the mixture was maintained at 3 to 3.5 by the addition of 20% sodium hydroxide solution.

After the addition was complete, the mixture was stirred at 40° C. for 15 minutes more and then cooled to 15° C. by adding ice. After another 10 minutes stirring period, there was obtained by filtration and finally washing with water and alcohol, 20.0 parts brown solid material consisting of barium sulfate and the crude folic acid.

We claim:

1. A method which comprises reacting together 2,4,5-triamino-6-hydroxypyrimidine, a trihalo acetone and a member of the group consisting of aminobenzoic acid and amides thereof whereby compounds having the general formula

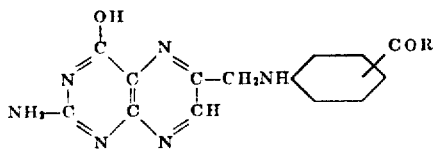

in which R is a member of the group consisting of hydroxyl, amino and substituted amino radicals are produced and recovered.

2. A method which comprises reacting together 2,4,5-triamino - 6 - hydroxypyrimidine, 1,1 - dichloro-3-bromo-propanone-2 and a member of the group consisting of aminobenzoic acid and amides thereof whereby compounds having the general formula

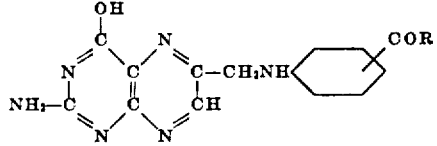

in which R is a member of the group consisting of hydroxyl, amino and substituted amino radicals are produced and recovered.

3. A method which comprises reacting together 2,4,5-triamino-6 - hydroxypyrimidine, 1,1,3 - trichloro-propanone-2 and a member of the group consisting of aminobenzoic acid and amides thereof whereby compounds having the general formula

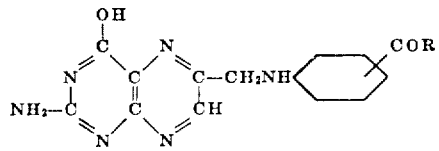

in which R is a member of the group consisting of hydroxyl, amino and substituted amino radicals are produced and recovered.

4. A method which comprises reacting together 2,4,5 - triamino - 6 - hydroxypyrimidine, 1,1,3-tribromo-propanone-2, and a member of the group consisting of aminobenzoic acid and amides thereof whereby compounds having the general formula

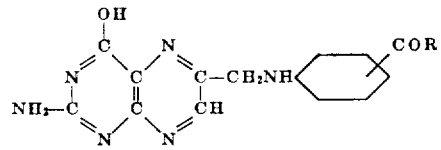

in which R is a member of the group consisting of hydroxyl, amino and substituted amino radicals are produced and recovered.

5. A method which comprises reacting together 2,4,5-triamino-6-hydroxypyrimidine, a trihalo acetone and an amino acid amide of para-aminobenzoic acid whereby compounds having the general formula

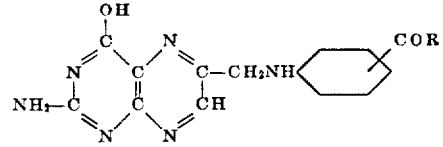

in which R is a radical of an amino acid being attached to the carbonyl group by an amide linkage are produced and recovered.

6. A method which comprises reacting together 2,4,5-triamino-6-hydroxy pyrimidine, a trihalo acetone and para-aminobenzoyl glutamic acid whereby pteroylglutamic acid is produced and recovered.

7. A method which comprises reacting together 2,4,5-triamino-6-hydroxy pyrimidine, 1,1-dichloro-3-bromo-propanone-2 and para-aminobenzoyl glutamic acid whereby pteroylglutamic acid is produced and recovered.

8. A method which comprises reacting together, 2,4,5-triamino-6-hydroxy pyrimidine, 1,1,3-trichloro-propanone-2 and para-aminobenzoyl glutamic acid whereby pteroylglutamic acid is produced and recovered.

9. A method which comprises reacting together 2,4,5-triamino-6-hydroxy pyrimidine, 1,1,3-tribromo-propanone-2 and para-aminobenzoyl glutamic acid whereby pteroylglutamic acid is produced and recovered.

10. A method which comprises reacting together 2,4,5-triamino-6-hydroxy pyrimidine, a 1,1,3-trihalo-propanone-2 and a glutamic acid amide of para-aminobenzoic acid whereby compounds having the general formula

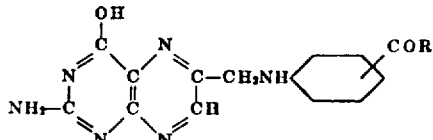

in which R is a glutamic acid radical are produced and recovered.

11. A method which comprises reacting together in aqueous solution at a pH within the range 1 to 5 2,4,5-triamino-6-hydroxypyrimidine, a 1,1,3-trihaloacetone and p-aminobenzoylglutamic acid whereby a compound having the general formula

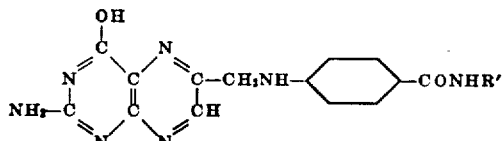

in which —NHR' is the radical of glutamic acid, is produced and thereafter recovering the said compound.

12. A method in accordance with claim 11 in which the p-aminobenzoylglutamic acid is added to the reaction mixture as a salt.

13. A method in accordance with claim 11 in which the p-aminobenzoylglutamic acid is added to the reaction mixture as an ester.

14. A method which comprises reacting together in aqueous solution at a pH within the range 1 to 5 2,4,5-triamino-6-hydroxypyrimidine, a 1,1,3-trihaloacetone and p-aminobenzoylglutamylglutamylglutamic acid whereby a compound having the general formula

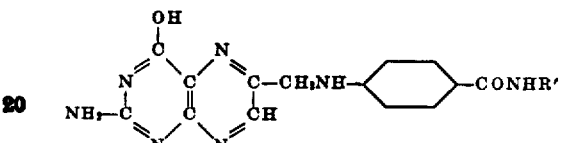

in which —NHR' is the radical of glutamylglutamylglutamic acid, is produced and thereafter recovering the said compound.

MARTIN E. HULTQUIST.
PAUL F. DREISBACH.

Certificate of Correction

Patent No. 2,443,165. June 8, 1948.

MARTIN E. HULTQUIST ET AL.

It is hereby certified that error appears in the printed specification of the above numbered patent requiring correction as follows:

Column 1, lines 32 to 37 inclusive, for that portion of the formula reading

and that the said Letters Patent should be read with this correction therein that the same may conform to the record of the case in the Patent Office.

Signed and sealed this 4th day of January, A. D. 1949.

[SEAL]

THOMAS F. MURPHY,
*Assistant Commissioner of Patents.* bromo-propanone-2 and para-aminobenzoyl glutamic acid whereby pteroylglutamic acid is produced and recovered.

10. A method which comprises reacting together 2,4,5-triamino-6-hydroxy pyrimidine, a 1,1,3-trihalo-propanone-2 and a glutamic acid amide of para-aminobenzoic acid whereby compounds having the general formula

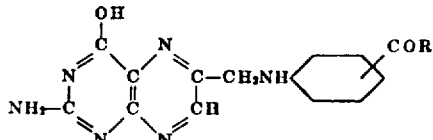

in which R is a glutamic acid radical are produced and recovered.

11. A method which comprises reacting together in aqueous solution at a pH within the range 1 to 5 2,4,5-triamino-6-hydroxypyrimidine, a 1,1,3-trihaloacetone and p-aminobenzoylglutamic acid whereby a compound having the general formula

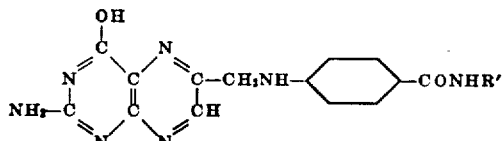

in which —NHR' is the radical of glutamic acid, is produced and thereafter recovering the said compound.

12. A method in accordance with claim 11 in which the p-aminobenzoylglutamic acid is added to the reaction mixture as a salt.

13. A method in accordance with claim 11 in which the p-aminobenzoylglutamic acid is added to the reaction mixture as an ester.

14. A method which comprises reacting together in aqueous solution at a pH within the range 1 to 5 2,4,5-triamino-6-hydroxypyrimidine, a 1,1,3-trihaloacetone and p-aminobenzoylglutamylglutamylglutamic acid whereby a compound having the general formula

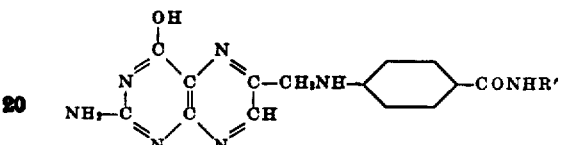

in which —NHR' is the radical of glutamylglutamylglutamic acid, is produced and thereafter recovering the said compound.

MARTIN E. HULTQUIST.
PAUL F. DREISBACH.

Certificate of Correction

Patent No. 2,443,165.  June 8, 1948.

MARTIN E. HULTQUIST ET AL.

It is hereby certified that error appears in the printed specification of the above numbered patent requiring correction as follows:

Column 1, lines 32 to 37 inclusive, for that portion of the formula reading

and that the said Letters Patent should be read with this correction therein that the same may conform to the record of the case in the Patent Office.

Signed and sealed this 4th day of January, A. D. 1949.

[SEAL]

THOMAS F. MURPHY,
*Assistant Commissioner of Patents.*